M. M. McINTYRE.
VEHICLE SPRING.
APPLICATION FILED JUNE 24, 1915.
1,217,970.
Patented Mar. 6, 1917.
2 SHEETS—SHEET 2.
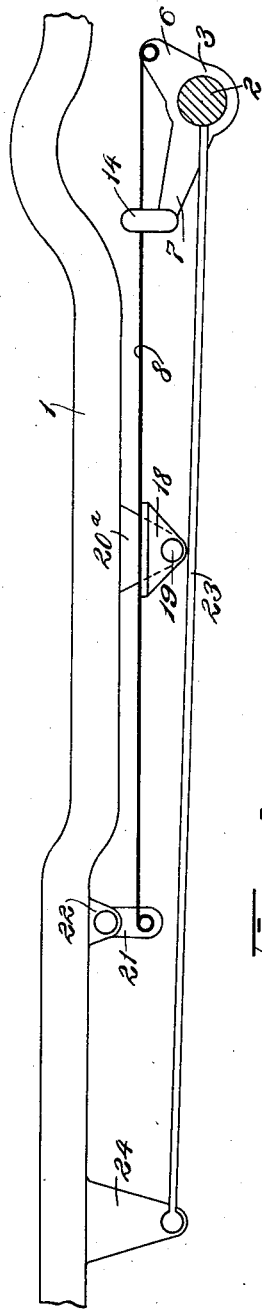
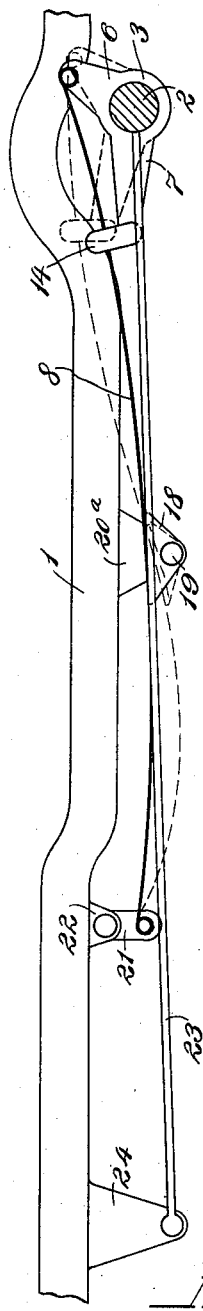

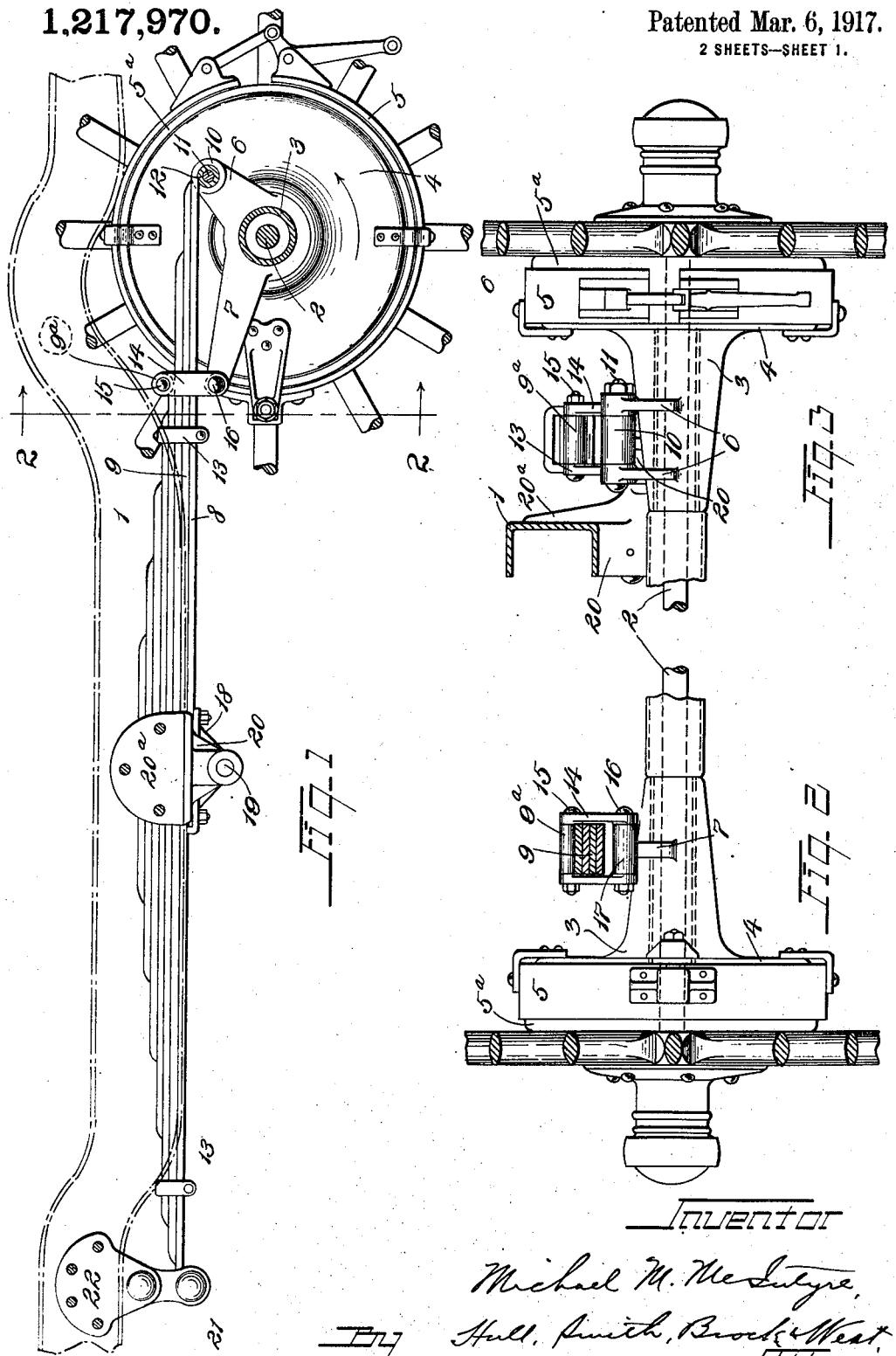

UNITED STATES PATENT OFFICE.

MICHAEL M. McINTYRE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-SPRING.

1,217,970. Specification of Letters Patent. Patented Mar. 6, 1917.

Application filed June 24, 1915. Serial No. 35,995.

*To all whom it may concern:*

Be it known that I, MICHAEL M. MCINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs and more particularly to springs of the cantaliver type. It is the general purpose of the invention to improve the manner of connecting such springs to their coöperating parts and particularly the manner of connecting such springs to the axle. More limitedly stated, the invention contemplates connecting the rear end of a rear cantaliver spring to a brake drum in such manner as to enable the spring to be used as a driving means and to enable the brake-torque to be transferred to and be absorbed by the body of the spring. A further object of the invention is to connect the rear end of a spring of this character to a free brake spider in such manner that the effect of a double-eye connection between the spring and the axle may be secured without the necessity for using an elongated eye. A still further object of the invention is to improve the efficiency of a spring of this character in a vehicle wherein a connecting member additional to the spring is used—as, for instance, a torque rod. Further and still more generally speaking, the invention may be defined as consisting of the combinations of elements embodied in the claims hereto annexed and illustrated in the drawings accompanying and forming part hereof, wherein Figure 1 represents a side elevation of a cantaliver spring and part of the side sill of an automobile, the axle being shown in section and the view including the bracket which is secured to the side sill, the sill being shown in broken lines; Fig. 2 is a sectional view corresponding to the line 2—2 of Fig. 1; Fig. 3 is a rear elevation of the rear axle showing the brake drum and spring; and Figs. 4 and 5 are diagrammatic views showing the action of the spring in connection with a torque member, the action of usual spring assemblies being indicated in dotted lines.

Describing by reference characters the various parts illustrated herein, 1 denotes the side sill or frame of an automobile, 2 the axle, 3 the hub and 4 the disk of the brake spider, 5 the outer and 5$^a$ the inner brake flange. The hub 3 is provided with a pair of rearwardly projecting arms 6 rigid therewith and with a forwardly projecting arm 7 also rigid therewith.

8 denotes the main plate and 9 the auxiliary superposed plates of a cantaliver spring. The rear end of the main plate is provided with an eye 10 whereby it is secured to a bolt 11 extending between and carried by the arms 6. If desired, a bushing 12 may be employed for the spring eye. 13 denotes a pair of rebound clips applied to the spring and 14 a pair of shackle links which are pivotally connected to an eye 9$^a$ on the end of one of the plates 9, as by means of a bolt 15. The lower ends of the shackle links 14 project a considerable distance below the main plate 8 and are connected to a pin 16 which extends through an eye 17 on the forward end of the arm 7.

The central portion of the spring is pivotally connected, in the usual manner, to the frame 1. For this purpose, the spring is connected in the ordinary manner to a spring seat 18 having a bolt 19 by which it is pivotally connected to a U-shaped bracket 20 secured to the frame by means of a base plate 20$^a$. The front end of the spring is pivotally connected to the frame by means of a pair of shackle links 21 carried by a bracket 22.

With the parts constructed and illustrated as described, the vehicle may be driven through the connection between the spring and the free brake-spider hub, the longitudinally spaced connection between the spring and this hub preventing rotation of the hub about the axle. When the brakes are applied, the brake-torque will be transmitted, as indicated by the arrow in Fig. 1, by means of the arms 7 and the shackle links 14 to the body of the spring, where an ample quantity of metal is provided to take care of and absorb this torque without injury to the spring, such as is liable to occur were it to be taken by a single plate, or even by two plates. Meanwhile, the links 14 permit and do not interfere with the "creeping", or relative longitudinal movement, of the spring plates due to the deflection of the spring in service. It will be evident that this absorption of the brake torque by the spring will lessen the shock imparted to the vehicle frame and improve the riding qualities.

In Figs. 4 and 5 I have shown somewhat diagrammatically the positions of the parts where my improved spring construction is employed with a connection independent of the spring as, for instance, a torque rod which is connected to the axle and to the frame. In Fig. 4, the parts are shown in the relative positions which they occupy when the frame and axle occupy their normal positions. In this view, the vehicle frame is indicated at 1, the spring at 8 and the axle at 2; the brake drum 3, the arms 6 and 7 and the shackle links 14 are also indicated in their normal positions. 23 denotes a torque member which may be a rod extending upwardly from a suitable part of the axle to a suitable part of the frame 24, to which the front end of said member may be pivoted. Fig. 5 shows in full lines the positions which these parts assume when the frame and axle approach each other, as in the case of the vehicle wheel passing over a large obstruction, the dotted lines indicating the positions which would be assumed by the parts were the rotatable connection between the spring and the axle omitted. It will be seen, by inspection of the last mentioned figure, that with a rigid connection between the spring and the axle, the dropping of the frame (or the rising of the axle) will cause the front end of the radius member to move downwardly to the extent indicated in such view, with the result that the spring will be reversely bowed, in the manner indicated. On the other hand, with the spring connected in accordance with my invention, the rear end of the spring can accommodate itself to the new positions assumed by the frame and axle without reversely bowing the opposite parts of the spring and without subjecting the springs to the strain incident to such reverse bowing. Furthermore, the spring is in better condition to absorb the shock. The use of a rotary spring seat upon an axle with a two-point connection between the spring and said seat is disclosed broadly in my application No. 828,694 filed April 1, 1914, and the use of this seat and connection with a radius member is indicated in one of the embodiments of my invention as disclosed in said application, but is not specifically claimed therein.

Having thus described my invention, what I claim is:—

1. The combination, with a vehicle frame and axle, of a brake member rotatably mounted upon the axle and having a pair of longitudinally spaced connecting portions, a spring, means for connecting one of the plates of said spring to one of said connecting portions, and means for connecting the body of the spring to the other connecting portion.

2. The combination, with a vehicle frame and axle, of a brake member rotatably mounted upon the axle and having a pair of longitudially spaced connecting portions, a spring, means for connecting one of the plates of said spring to one of said connecting portions, and a swinging-link connection between the body portion of the spring and the other connecting portion of said member.

3. The combination, with a vehicle frame and axle, of a brake member rotatably mounted upon the axle and having a pair of longitudinally spaced connecting portions, a spring, means for connecting one end of said spring to one of said connecting portions, and a connection between the body portion of the spring and the other connecting portion of said member.

4. The combination, with a vehicle frame and axle, of a brake member rotatably mounted upon the axle and having a pair of longitudinally spaced connecting portions, a spring, means for connecting one of the plates of said spring to one of said connecting portions, means connecting the body of the spring to the other connecting portion, means pivotally connecting the central portion of the spring to the frame, and means for connecting to the frame the end of the spring which is opposite the axle.

5. The combination, with a vehicle frame and axle, of a brake member rotatably mounted upon the axle and having a pair of longitudinally spaced connecting portions, a spring, means for connecting one of the plates of said spring to one of said connecting portions, a flexible connection between the body portion of the spring and the other connecting portion of said member, means pivotally connecting the central portion of the spring to the frame, and means for connecting to the frame the end of the spring which is opposite the axle.

6. The combination, with a vehicle frame and axle, of a member rotatably mounted on the axle and having a pair of longitudinally spaced connecting portions, a spring, means for connecting one end of said spring to one of said portions, a swinging link connection between the other connecting portion and body of the spring, means pivotally supporting the central portion of the spring from the frame, and means connecting the frame to the end of the spring opposite the axle.

7. The combination, with a vehicle frame and axle, of a member rotatably mounted on the axle and having a pair of longitudinally spaced connecting portions, a spring, means for connecting one of the plates of said spring to one of said portions, a flexible connection between the other connecting portion and the body of the spring, and a driving connection between the spring and the frame.

8. The combination, with a vehicle frame and axle, of a brake spider having a hub free upon said axle, said hub being provided with rearwardly and forwardly projecting connecting portions, a spring, a connection between one of the leaves of said spring and the rearwardly projecting connecting portion, a flexible connection between the forwardly projecting connecting portion and the body of the spring, a pivotal connection between the central portion of the spring and the frame, and means connecting to the frame the end of the spring which is opposite the axle.

9. The combination, with a vehicle frame and axle, of a spring connected at its central portion to the frame and having one end connected to said frame, a brake member on said axle, a driving connection between the opposite end of the spring and the axle, and connections between the brake member and the body portion of the spring, whereby the braking torque will be transmitted from the brake member to such portion of the spring.

10. The combination, with a vehicle frame and axle, of a brake on said axle, driving connections between the spring and the axle and frame, and connections between the brake and the spring whereby the torque of the brake will be transmitted to the body portion of the spring.

11. The combination, with a vehicle frame and axle, of a spring, a pivotal connection between the central portion of the spring and the frame, means connecting one end of said spring to the frame, a brake spider hub free upon the axle, a driving connection between said hub and the other end of the spring, and means for transmitting the braking torque from the spider to the body portion of the spring.

12. The combination, with a vehicle frame and axle, of a spring, a driving connection between said spring and frame, a brake spider hub free upon the axle, a driving connection between said hub and the spring, and means for transmitting the braking torque from the spider to the body portion of the spring.

13. The combination, with a vehicle frame and axle, of a spring, means pivotally connecting the central portion of the spring to the frame, means connecting one end of said spring to the frame, a brake spider free upon the axle, and means connecting the opposite end of the spring to said spider.

14. The combination, with a vehicle frame and axle, of a brake spider free upon the axle, a spring having a driving connection with the brake spider and the frame.

15. The combination, with a vehicle frame and axle, of a spring, means pivotally connecting the central portion of the spring to the frame, means connecting one end of said spring to the frame, a brake spider free upon the axle, and longitudinally spaced connecting devices carried by the brake spider and connected respectively to the opposite end of the spring and to the body portion of the spring.

16. The combination, with a vehicle frame and axle, of a spring, a rotatable member on the axle having longitudinally spaced connecting portions, a driving connection between said spring and said frame, a driving connection between said spring and one of said portions, and a connection between the spring and the other connecting portion adapted to transmit brake torque to the body of the spring without interfering with the relative longitudinal movement of the spring plates.

17. The combination, with a vehicle frame and axle, of a spring, a brake on said axle, a driving connection between the spring, and the frame, and connections between the spring, the brake, and the axle whereby the torque of the brake will be transmitted to the body portion of the spring without interfering with the relative longitudinal movement between the spring leaves or plates.

18. The combination, with a vehicle frame and axle, of a spring, a brake comprising a hub free on said axle, driving connections between said hub, spring, and frame, and a connection between the hub and the body portion of the spring for transmitting the braking torque to the body of the spring without interfering with the relative longitudinal movement between the spring leaves or plates.

19. The combination, with a vehicle frame and axle, of a torque resisting connection between the axle and the frame, a spring, a rotatable member upon the axle, means connecting longitudinally spaced portions of one end of the spring to said member, means connecting the body portion of the spring to the frame, and a connection between the opposite end of the spring and the frame.

20. The combination, with a vehicle frame and axle, of a torque resisting connection between the axle and the frame, a spring, a brake having a hub free on the axle, means connecting one end of the spring to said hub, means connecting the body portion of the spring to the frame, and a connection between the opposite end of the spring and said frame.

21. The combination, with a vehicle frame and axle, of a torque resisting connection between the frame and the axle, a brake hub free on said axle, a spring, means connecting longitudinally spaced portions of one end of the spring to said hub, means pivotally connecting the body portion of the spring to the frame, and a yielding connection between the opposite end of the spring and the frame.

In testimony whereof, I hereunto affix my signature in the presence of two witnesses.

MICHAEL M. McINTYRE.

Witnesses:
J. B. HULL,
H. E. FIGGIE.